US009139801B2

(12) United States Patent
Hunt et al.

(10) Patent No.: US 9,139,801 B2
(45) Date of Patent: Sep. 22, 2015

(54) METALLIC SOAP COMPOSITIONS FOR VARIOUS APPLICATIONS

(75) Inventors: Zachary J. Hunt, Simpsonville, SC (US); James L. Flowers, Greenville, SC (US); S. Alexander Christensen, Northwoods, IL (US)

(73) Assignee: Elevance Renewable Sciences, Inc., Woodridge, IL (US)

( * ) Notice: Subject to any disclaimer, the term of this patent is extended or adjusted under 35 U.S.C. 154(b) by 551 days.

(21) Appl. No.: 13/543,102

(22) Filed: Jul. 6, 2012

(65) Prior Publication Data

US 2013/0008341 A1 Jan. 10, 2013

Related U.S. Application Data

(60) Provisional application No. 61/506,144, filed on Jul. 10, 2011.

(51) Int. Cl.
| | | |
|---|---|---|
| C11D 9/02 | (2006.01) | |
| C11D 9/00 | (2006.01) | |
| C11D 13/00 | (2006.01) | |
| C11D 13/04 | (2006.01) | |

(52) U.S. Cl.
CPC ........ *C11D 9/02* (2013.01); *C11D 13/00* (2013.01); *C11D 13/04* (2013.01)

(58) Field of Classification Search
None
See application file for complete search history.

(56) References Cited

U.S. PATENT DOCUMENTS

| | | |
|---|---|---|
| 1,935,946 A | 11/1933 | Egan et al. |
| 1,954,659 A | 4/1934 | Will |
| 2,294,229 A | 8/1942 | Fiero |
| 2,389,955 A * | 11/1945 | Buxton .................. 424/554 |
| 2,468,799 A | 5/1949 | Ziels et al. |
| 2,650,932 A * | 9/1953 | Kebrich et al. .............. 554/73 |
| 2,784,891 A | 3/1957 | Thielke |
| 3,251,869 A | 5/1966 | Putnam et al. |
| 3,448,178 A | 6/1969 | Flanagan |
| 3,630,697 A | 12/1971 | Duling et al. |
| 3,645,705 A | 2/1972 | Miller et al. |
| 3,663,583 A * | 5/1972 | Haynes ................... 554/149 |
| 3,744,956 A | 7/1973 | Hess |
| 3,844,706 A | 10/1974 | Tsaras |
| 4,118,203 A | 10/1978 | Beardmore et al. |
| 4,134,718 A | 1/1979 | Kayfetz et al. |
| 4,235,794 A | 11/1980 | Rieber et al. |
| 4,292,088 A | 9/1981 | Scheuffgen et al. |
| 4,293,345 A | 10/1981 | Zeilstra et al. |
| 4,307,027 A | 12/1981 | Borzelli et al. |
| 4,314,915 A | 2/1982 | Wiegers et al. |
| 4,390,590 A | 6/1983 | Saunders et al. |
| 4,411,829 A | 10/1983 | Schulte-Elte et al. |
| 4,434,306 A | 2/1984 | Kobayashi et al. |
| 4,507,077 A | 3/1985 | Sapper |
| 4,545,941 A * | 10/1985 | Rosenburg ................ 554/163 |
| 4,554,107 A | 11/1985 | Takao |
| 4,567,548 A | 1/1986 | Schneeberger |
| 4,608,011 A | 8/1986 | Comstock |
| 4,614,625 A | 9/1986 | Wilson |
| 4,623,488 A | 11/1986 | Takao |
| 4,714,496 A | 12/1987 | Luken, Jr. et al. |
| 4,759,709 A | 7/1988 | Luken, Jr. et al. |
| 4,813,975 A | 3/1989 | Poulina et al. |
| 4,842,648 A | 6/1989 | Phadoemchit et al. |
| 4,855,098 A | 8/1989 | Taylor |
| 4,923,708 A | 5/1990 | Given, Jr. |
| 4,927,548 A | 5/1990 | Hirsch et al. |
| 5,171,329 A | 12/1992 | Lin |
| 5,258,197 A | 11/1993 | Wheeler et al. |
| 5,274,144 A | 12/1993 | Wuest et al. |
| 5,338,187 A | 8/1994 | Elharar |
| 5,380,544 A | 1/1995 | Klemann et al. |
| 5,578,089 A | 11/1996 | Elsamaloty |
| 5,660,865 A | 8/1997 | Pedersen et al. |
| 5,700,516 A | 12/1997 | Sandvick et al. |
| 5,723,137 A | 3/1998 | Wahle et al. |
| 5,753,015 A | 5/1998 | Sinwald et al. |
| 5,843,194 A | 12/1998 | Spaulding |
| 5,885,600 A | 3/1999 | Blum et al. |
| 5,888,487 A | 3/1999 | Baumoeller et al. |
| 6,001,286 A | 12/1999 | Sleeter |
| 6,019,804 A | 2/2000 | Requejo et al. |
| 6,022,402 A | 2/2000 | Stephenson et al. |
| 6,063,144 A | 5/2000 | Calzada et al. |
| 6,099,877 A | 8/2000 | Schuppan |
| 6,103,308 A | 8/2000 | Floyd et al. |

(Continued)

FOREIGN PATENT DOCUMENTS

| | | | |
|---|---|---|---|
| DE | 19956226 A1 | 5/2001 | |
| EP | 0536861 A1 | 4/1993 | |

(Continued)

OTHER PUBLICATIONS

Behren et al., "Beeswax and other Non-Paraffin Waxes," Presented at NCA Technical Meeting, Jun. 19-20, 1991, 6 pages.

(Continued)

*Primary Examiner* — Joseph D Anthony
(74) *Attorney, Agent, or Firm* — Robert S. Dailey; Nirav Patel

(57) ABSTRACT

Metallic soap compositions for use in various applications, including as adhesives, as having anti-corrosion properties on certain surfaces or materials, and as asphalt modifiers to reduce viscosity in an asphalt mixture, and process for making the same, are disclosed. The processes comprise at least a partial saponification of a mixture of an oil, often a natural oil which may be hydrogenated and/or metathesized, and a metal compound via a fusion process, or may comprise at least a partial saponification of a mixture of a similar oil and a metal compound, or optionally a fatty acid derived from a similar oil, via an aqueous process, with an optional addition of an inorganic metal salt via at least one ion exchange reaction.

4 Claims, No Drawings

(56) References Cited

U.S. PATENT DOCUMENTS

| | | |
|---|---|---|
| 6,106,597 A | 8/2000 | Starks et al. |
| 6,123,979 A | 9/2000 | Hepburn et al. |
| 6,127,326 A | 10/2000 | Dieckmann et al. |
| 6,132,742 A | 10/2000 | Le Bras et al. |
| 6,156,369 A | 12/2000 | Eger et al. |
| 6,201,053 B1 * | 3/2001 | Dieckmann et al. .......... 524/301 |
| 6,214,918 B1 | 4/2001 | Johnson et al. |
| 6,224,641 B1 | 5/2001 | Matzat et al. |
| 6,238,926 B1 | 5/2001 | Liu et al. |
| 6,255,375 B1 | 7/2001 | Michelman |
| 6,258,965 B1 | 7/2001 | O'Lenick, Jr. |
| 6,262,153 B1 | 7/2001 | Webster et al. |
| 6,276,925 B1 | 8/2001 | Varga |
| 6,277,310 B1 | 8/2001 | Sleeter |
| 6,284,007 B1 | 9/2001 | Tao |
| 6,497,735 B2 | 12/2002 | Tao |
| 6,503,077 B2 | 1/2003 | Orth et al. |
| 6,503,285 B1 | 1/2003 | Murphy |
| 6,582,748 B1 | 6/2003 | Loh et al. |
| 6,586,506 B2 | 7/2003 | Webster et al. |
| 6,599,334 B1 | 7/2003 | Anderson |
| 6,645,261 B2 | 11/2003 | Murphy et al. |
| 6,673,763 B1 | 1/2004 | Hansen et al. |
| 6,730,137 B2 | 5/2004 | Pesu et al. |
| 6,733,548 B2 | 5/2004 | Rasmussen et al. |
| 6,758,869 B2 | 7/2004 | Roeske et al. |
| 6,770,104 B2 | 8/2004 | Murphy |
| 6,773,469 B2 | 8/2004 | Murphy |
| 6,797,020 B2 | 9/2004 | Murphy |
| 6,824,572 B2 | 11/2004 | Murphy |
| 6,846,573 B2 | 1/2005 | Seydel |
| 6,852,140 B1 | 2/2005 | Roeske |
| 6,890,982 B2 | 5/2005 | Borsinger et al. |
| 6,943,262 B2 | 9/2005 | Kodali et al. |
| 7,037,439 B2 | 5/2006 | Tavares |
| 7,128,766 B2 | 10/2006 | Murphy et al. |
| 7,176,171 B2 | 2/2007 | Nieendick et al. |
| 7,192,457 B2 | 3/2007 | Murphy et al. |
| 7,217,301 B2 | 5/2007 | Murphy et al. |
| 7,387,649 B2 | 6/2008 | Tao |
| 7,462,205 B2 | 12/2008 | Murphy |
| 7,510,584 B2 | 3/2009 | Cap |
| 7,569,084 B2 | 8/2009 | Tao et al. |
| 7,588,607 B1 | 9/2009 | Cap |
| 7,601,184 B2 | 10/2009 | Tischendorf |
| 7,637,968 B2 | 12/2009 | Murphy |
| 7,795,336 B2 | 9/2010 | Paul et al. |
| 7,833,294 B2 | 11/2010 | Murphy et al. |
| 2001/0013195 A1 | 8/2001 | Tao |
| 2001/0051680 A1 | 12/2001 | Webster et al. |
| 2002/0005007 A1 | 1/2002 | Roeske et al. |
| 2002/0144455 A1 | 10/2002 | Bertrand et al. |
| 2002/0157303 A1 | 10/2002 | Murphy et al. |
| 2003/0008257 A1 | 1/2003 | Tao |
| 2003/0017431 A1 | 1/2003 | Murphy |
| 2003/0022121 A1 | 1/2003 | Biggs |
| 2003/0046860 A1 | 3/2003 | Tiffany et al. |
| 2003/0057599 A1 | 3/2003 | Murphy et al. |
| 2003/0061760 A1 | 4/2003 | Tao et al. |
| 2003/0091949 A1 | 5/2003 | Pesu et al. |
| 2003/0110683 A1 | 6/2003 | Murphy |
| 2003/0134244 A1 | 7/2003 | Gray et al. |
| 2003/0198826 A1 | 10/2003 | Seydel |
| 2003/0207971 A1 | 11/2003 | Stuart, Jr. et al. |
| 2003/0213163 A1 | 11/2003 | Berger et al. |
| 2004/0000088 A1 | 1/2004 | Wesley |
| 2004/0037859 A1 | 2/2004 | Cecchi et al. |
| 2004/0047886 A1 | 3/2004 | Murphy et al. |
| 2004/0076732 A1 | 4/2004 | Valix |
| 2004/0088907 A1 | 5/2004 | Murphy |
| 2004/0088908 A1 | 5/2004 | Murphy |
| 2004/0138359 A1 | 7/2004 | Dinkelaker et al. |
| 2004/0200136 A1 | 10/2004 | Tao et al. |
| 2004/0221503 A1 | 11/2004 | Murphy et al. |
| 2004/0221504 A1 | 11/2004 | Murphy |
| 2004/0250464 A1 | 12/2004 | Rasmussen et al. |
| 2005/0014664 A1 | 1/2005 | Nadolsky et al. |
| 2005/0060927 A1 | 3/2005 | Murphy |
| 2005/0095545 A1 | 5/2005 | Tischendorf |
| 2005/0123780 A1 | 6/2005 | Seydel |
| 2005/0158679 A1 | 7/2005 | Chen et al. |
| 2005/0269728 A1 | 12/2005 | Roos |
| 2006/0236593 A1 | 10/2006 | Cap |
| 2006/0272199 A1 | 12/2006 | Licciardello et al. |
| 2006/0272200 A1 | 12/2006 | Murphy et al. |
| 2007/0006521 A1 | 1/2007 | Licciardello et al. |
| 2007/0006522 A1 | 1/2007 | Tao |
| 2007/0039237 A1 | 2/2007 | Murphy et al. |
| 2007/0056211 A1 | 3/2007 | Li et al. |
| 2007/0144058 A1 | 6/2007 | Chen et al. |
| 2007/0151480 A1 | 7/2007 | Bloom et al. |
| 2007/0270621 A1 | 11/2007 | Millis et al. |
| 2007/0282000 A1 | 12/2007 | Murphy et al. |
| 2008/0027194 A1 | 1/2008 | Schrodi |
| 2008/0064891 A1 | 3/2008 | Lee |
| 2008/0138753 A1 | 6/2008 | Tao et al. |
| 2008/0145808 A1 | 6/2008 | Lee |
| 2008/0206411 A1 | 8/2008 | Nielsen |
| 2008/0307696 A1 | 12/2008 | Wu et al. |
| 2009/0048459 A1 | 2/2009 | Tupy et al. |
| 2009/0119977 A1 | 5/2009 | Murphy |
| 2009/0217568 A1 | 9/2009 | Murphy et al. |
| 2009/0259065 A1 | 10/2009 | Abraham et al. |
| 2009/0264672 A1 | 10/2009 | Abraham et al. |
| 2010/0024281 A1 | 2/2010 | Lemke et al. |
| 2010/0044924 A1 | 2/2010 | Cap |
| 2010/0047499 A1 | 2/2010 | Braksmayer et al. |
| 2010/0132250 A1 | 6/2010 | Uptain et al. |
| 2010/0145086 A1 | 6/2010 | Schrodi et al. |
| 2010/0205851 A1 | 8/2010 | Uptain et al. |
| 2011/0160472 A1 * | 6/2011 | Lemke et al. .................. 554/154 |

FOREIGN PATENT DOCUMENTS

| | | |
|---|---|---|
| EP | 0545715 A1 | 6/1993 |
| EP | 0685554 A1 | 12/1995 |
| EP | 0811664 A1 | 12/1997 |
| EP | 1693436 A1 | 8/2006 |
| EP | 1696022 A1 | 8/2006 |
| EP | 1801096 A1 | 6/2007 |
| JP | 56-032550 A | 4/1981 |
| JP | 04-059897 A | 2/1992 |
| JP | 06-009987 A | 1/1994 |
| JP | 09-014574 A | 1/1997 |
| WO | WO 92/00269 | 1/1992 |
| WO | WO 96/00815 A1 | 1/1996 |
| WO | WO 96/14373 A1 | 5/1996 |
| WO | WO 98/45390 A1 | 10/1998 |
| WO | WO 99/27043 A1 | 6/1999 |
| WO | WO 02/30386 A1 | 4/2002 |
| WO | WO 02/092736 A1 | 11/2002 |
| WO | WO 03/012016 A1 | 2/2003 |
| WO | WO 03/051134 A2 | 6/2003 |
| WO | WO 03/057983 A1 | 7/2003 |
| WO | WO 03/104348 A1 | 12/2003 |
| WO | WO 2004/033388 A1 | 4/2004 |
| WO | WO 2004/083310 A1 | 9/2004 |
| WO | WO 2004/101720 A1 | 11/2004 |
| WO | WO 2005/042655 A2 | 5/2005 |
| WO | WO 2006/041011 A1 | 4/2006 |
| WO | WO 2006/076364 A2 | 7/2006 |
| WO | WO 2007/002999 A1 | 1/2007 |
| WO | WO 2007/143454 A2 | 12/2007 |
| WO | WO 2008/008420 A1 | 1/2008 |
| WO | WO 2008/010961 A1 | 1/2008 |
| WO | WO 2008/048520 A2 | 4/2008 |
| WO | WO 2008/103289 A1 | 8/2008 |
| WO | WO 2008/140468 A2 | 11/2008 |
| WO | WO 2008/151064 A1 | 12/2008 |
| WO | WO 2008/157436 A1 | 12/2008 |

(56) References Cited

OTHER PUBLICATIONS

Bell et al., "Sperm Oil Replacements: Synthetic Wax Esters from Selectively Hydrogenated Soybean and Linseed Oils," Journal of the American Chemical Society, Jun. 1997, vol. 54, pp. 259-263.

Erhan et al., "Drying Properties of Metathesized Soybean Oil," Journal of American Oil Chemists' Society, AOCS Press, vol. 74, No. 6, 1997, pp. 703-706.

Frahm, "Harvest Lights: The only soy-based candle, a bright idea," available at http://www.extension.uiuc.edu/~stratsoy/new/news/html/909166253,html, Oct. 23, 1998, 2 pages.

Mol, "Applications of Olefin Metathesis in Oleochemistry: An Example of Green Chemistry," Green Chemistry, Royal Society of Chemistry, Cambridge, GB, vol. 4, 2002, pp. 5-13.

Noller, Chemistry of Organic Compounds, W.B. Saunders Company, $2^{nd}$ Ed., 1957, pp. 181 and 192.

Oliefabrik et al., "Paper coating", Research Disclosure Journal, Dec. 1996, 2 pages.

Orso, "New Use for Soybeans Has Bright Future," available at http://www.unitedsoybean.com/news/nr981014.htm, Oct. 14, 1998, 2 pages.

Rezaei, "Hydrogenated Vegetable Oils as Candle Wax," J. of the Am. Oil Chemists' Society, vol. 12, No. 79, pp. 1241-1247 (Dec. 2002).

Tao, "Development of Vegetable Lipid-based Candles," available at http://abe.www.ecn.purdue.edu/ABE/Research/research94/REPORT.94.Book_68.htmls, 1994, 2 pages.

In Business, "America's Shining Example of Sustainable Business," available at http://www.candleworks.org, Mar./Apr. 1998, 3 pages.

Pages from Bitter Creek Candle Supply, Inc., website (http://www.execpc.com/~bcsupply) now at http://www.candlesupply.com, available at least by Jun. 29, 2000, 9 pages.

Pages from Ecowax, Nature's Gift, Inc., website (http://nglwax.com/ecowax.htm), available at least by Jul. 5, 2000, 3 pages.

Pages from Heartland Candleworks website, available at www.candleworks.org, available at least by Feb. 11, 2000, 4 pages.

Purdue Agriculture News, Purdue May Agriculture & Natural Resources Package, available at http://purduenews.uns.purdue.edu/UNS/paks/agpak.digest.9605.html, May 1996, 3 pages.

Purdue News, "Purdue students put the 'happy' back into birthday candles," available at http://www.purdue.edu/UNS/html4ever/9611.Schweitzer.candles.html, Nov. 1996, 3 pages.

Purdue News, "Purdue students put the 'happy' back into birthday candles," available at http://www.purdue.edu/UNS/html4ever/9604.Schweitzer.candles.html, May 1996, 2 pages.

Purdue University School of Agriculture, 1998 Farm Progress Show, available at http://www.admin.ces.purdue.edu/anr/98fps/fpspix/930.html, 1998, 4 pages.

* cited by examiner

METALLIC SOAP COMPOSITIONS FOR VARIOUS APPLICATIONS

CROSS REFERENCE TO RELATED APPLICATIONS

This application claims the benefit of U.S. Provisional Patent Application No. 61/506,144, filed Jul. 10, 2011, which is incorporated herein by reference.

BACKGROUND

Metallic salts of higher molecular weight fatty acids are commercially known as metallic soaps. Metallic soaps are well known and have been widely used in the industries of resins, paints, papers, fibers, greases, etc. as stabilizers, lubricants, water-repellents, thickeners, coating agents, for example. In addition to such uses, metallic soaps are used as catalysts in chemical reactions, and also as additives for rubber to improve adhesive properties or bonding of the rubber with steel cords.

The methods known in the art for industrial production of metallic soap include various methods. One of them is the double decomposition (aqueous) method wherein a water-soluble metal salt and a metal salt of a fatty acid are reacted in an aqueous solution state to produce water-insoluble metallic soap. Another method of producing metallic soap is the fusion process, in which a form of a metal is employed, including metal alkoxides, metal oxides, metal hydroxides or metal carbonates and the like, and a fatty acid are reacted by fusing these at a temperature above the melting point of the metallic soap to be formed, and by-produced water and/or carbon dioxide gas is expelled out of the reaction system, whereby the metallic soap is taken out in a molten state. Another method for the production of soaps is through phase transfer catalysis. Phase transfer catalysis is a synthesis method which allows the use of relatively simple two-phase reaction systems in the place of solvent systems which may be toxic and/or expensive. In fundamental terms, phase transfer catalysis employs a phase transfer catalyst which facilitates the transfer of a reactive species from the first phase, normally aqueous, into the second phase, normally organic, where the desired reaction can take place. Various processes for making metallic soaps have been described in the art, including U.S. Pat. No. 4,397,760, U.S. Pat. No. 4,927,548, U.S. Pat. No. 4,235,794, U.S. Pat. No. 4,307,027, U.S. Pat. No. 5,274,144, and U.S. Pat. No. 2,650,932, the disclosures of which are herein incorporated by reference in their entireties.

In particular, the fatty acids referenced above can be obtained by any suitable source of natural fats, including natural oils. Further, the metals referenced above may include non-limiting examples such as beryllium, magnesium, manganese, calcium, lithium, sodium, strontium and barium; transition metals such as titanium, vanadium, chromium, manganese, iron, cobalt, nickel, copper, zinc, zirconium, molybdenum, palladium, silver, cadmium, tungsten and mercury; and other metals such as aluminum, gallium, tin, iron, lead, and lanthanoid metals. Metallic soaps have been synthesized from natural oils by saponifying the oils with varying quantities of a metal compound such as metal oxides, metal carbonates, metal hydroxides, or metal alkoxides. Generally, saponification means either the neutralization of fatty acids to produce soap or the saponification of fats and/or oils to produce soap. Saponification involves hydrolysis of esters under basic conditions to form an alcohol and the salt of a carboxylic acid (carboxylates). More specifically, the use of fatty acids and the addition of specific types and amounts of natural oils, then altering them through adding a metal base saponifies the fatty acids into soaps.

Typically, the range of properties produced by saponification of a natural oil is rather limited. Thus, there is a need to create metallic soap compositions having a diverse range of properties and applications, and in particular, adhesive properties and anti-corrosion properties on certain surfaces or materials, and as asphalt modifiers to reduce viscosity in an asphalt mixture.

SUMMARY

One aspect is directed to a metallic soap composition produced by a process which comprises at least a partial saponification of a mixture of an oil and a metal compound. The oil can be a metathesized natural oil, hydrogenated metathesized natural oil, hydrogenated natural oil, or a natural oil, or mixtures thereof, and the metal compound can be a metal oxide, metal hydroxide, or metal carbonate, or mixtures thereof. The process comprises the steps of first heating and purging the oil in a reactor at a temperature between about 70° C. to about 140° C. in a nitrogenous atmosphere, and then heating and purging the mixture of the oil and metal compound in the reactor at a temperature between about 200° C. to about 400° C. in the nitrogenous atmosphere. The reaction mixture is removed from the reactor, and cooled to obtain the metallic soap composition.

Another aspect is a metallic soap composition produced by a process which comprises at least a partial saponification of a mixture of an oil comprising up to about 100% by weight of a metathesized natural oil, and a metal hydroxide. The process comprises the steps of first heating and purging the oil in a reactor at a temperature between about 95° C. to about 105° C. in a nitrogenous atmosphere, and then heating and purging the mixture of the oil and the metal hydroxide in the reactor at a temperature between about 290° C. to about 310° C. in the nitrogenous atmosphere. The reaction mixture is removed from the reactor, and cooled to obtain said metallic soap composition.

Another aspect is a metallic soap composition produced by a process which comprises at least a partial saponification of a mixture of an oil and at least one metal compound, or optionally neutralization of a fatty acid derived from an oil and at least one metal compound. Thereafter, the subsequent addition of an inorganic metal salt for at least one ion exchange reaction is added to this mixture. The oil can be a metathesized natural oil, hydrogenated metathesized natural oil, hydrogenated natural oil, or a natural oil, or mixtures thereof, and the metal compound can be a metal alkoxide, metal oxide, metal hydroxide, or metal carbonate, or mixtures thereof, and the inorganic metal salt can be metal hydroxides or metal chlorides. The process comprises the steps of (a) heating said mixture in a reactor at a temperature between about 75° C. to about 150° C. in an aqueous environment; (b) removing the reaction mixture from the reactor and cooling the mixture to obtain a first metallic soap composition. Thereafter, the inorganic metal salt is added to this mixture of step (b) prior to cooling, wherein the ion exchange reaction occurs at a temperature between about 50° C. to 150° C., and then recovering and thereafter cooling said mixture of step (c) to obtain a second metallic soap composition.

Another aspect is a metallic soap composition produced by a process which comprises at least a partial saponification of a mixture of a metathesized natural oil and a metal hydroxide, and the subsequent addition of a metal chloride for at least one ion exchange reaction. The process comprises the steps of (a)

heating the mixture in a reactor at a temperature between about 90° C. to about 100° C. in an aqueous environment; (b) removing the reaction mixture from the reactor; (c) adding to the mixture of step (b), the metal chloride for the ion exchange reaction, which occurs at a temperature between about 70° C. to about 100° C.; and (d) recovering and cooling the mixture from step (c) to obtain the metallic soap composition.

Another aspect is a metallic soap composition produced by a process which comprises at least a partial saponification of an oil and a metal compound, or optionally neutralization of a fatty acid derived from an oil and at least one metal compound. The oil can be a metathesized natural oil, hydrogenated metathesized natural oil, hydrogenated natural oil, or a natural oil, or mixtures thereof, and the metal compound can be a metal alkoxide, metal oxide, metal hydroxide, or metal carbonate, or mixtures thereof. The process comprises the steps of (a) heating said mixture in a reactor at a temperature between about 75° C. to about 150° C. in an aqueous environment, and (b) removing said reaction mixture from said reactor and cooling said mixture to obtain the metallic soap composition.

DETAILED DESCRIPTION

The present application relates to metallic soap compositions exhibiting use in various applications, including but not limited to, as adhesives, as having anti-corrosion properties on certain surfaces or materials, and as asphalt modifiers to reduce viscosity in asphalt mixtures, and processes of making such compositions. As used herein, the metallic soap compositions shall be understood to include at least one metallic soap composition, or stated alternatively, one or more metallic soap compositions.

As used herein, the singular forms "a," "an," and "the" include plural referents unless the context clearly dictates otherwise. For example, reference to "a substituent" encompasses a single substituent as well as two or more substituents, and the like. Also, for example, a "metallic soap composition" shall encompass a single metallic soap composition, at least one metallic soap composition, or one or more metallic soap compositions.

As used herein, the terms "for example," "for instance," "such as," or "including" are meant to introduce examples that further clarify more general subject matter. Unless otherwise specified, these examples are provided only as an aid for understanding the applications illustrated in the present disclosure, and are not meant to be limiting in any fashion.

As used herein, the following terms have the following meanings unless expressly stated to the contrary. It is understood that any term in the singular may include its plural counterpart and vice versa.

As used herein, the term "natural oil" may refer to oils and/or fats derived from plants or animal sources. The term "natural oil" includes natural oil derivatives, unless otherwise indicated (which may include fatty acids derived from a metathesized natural oil). Examples of natural oils include, but are not limited to, vegetable oils, algae oils, animal fats, tall oils, derivatives of these oils, combinations of any of these oils, and the like. Representative non-limiting examples of vegetable oils include canola oil, rapeseed oil, coconut oil, corn oil, cottonseed oil, linseed oil, olive oil, palm oil, peanut oil, safflower oil, sesame oil, soybean oil, sunflower oil, palm kernel oil, tung oil, jatropha oil, mustard oil, camelina oil, pennycress oil, hemp oil, algal oil, and castor oil. Representative non-limiting examples of animal fats include lard, tallow, poultry fat, yellow grease, and fish oil. Tall oils are by-products of wood pulp manufacture. In certain embodiments, the natural oil may be refined, bleached, and/or deodorized (stripped).

In certain embodiments, the natural oil has been metathesized in the presence of a metathesis catalyst to form a metathesized natural oil. Metathesis is a catalytic reaction that involves the interchange of alkylidene units among compounds containing one or more double bonds (i.e., olefinic compounds) via the formation and cleavage of the carbon-carbon double bonds. The metathesis catalyst in this reaction may include any catalyst or catalyst system that catalyzes a metathesis reaction. Any known metathesis catalyst may be used, alone or in combination with one or more additional catalysts. Non-limiting exemplary metathesis catalysts and process conditions are described in PCT/US2008/009635, pp. 18-47, incorporated by reference herein. A number of the metathesis catalysts as shown are manufactured by Materia, Inc. (Pasadena, Calif.).

In some embodiments, the metathesized natural oil is a metathesized vegetable oil, metathesized algae oil, metathesized animal fat, metathesized tall oil, metathesized derivatives of these oils, and mixtures thereof. In one embodiment, the metathesized vegetable oil is metathesized canola oil, metathesized rapeseed oil, metathesized coconut oil, metathesized pennycress oil, metathesized algal oil, metathesized camellina oil, metathesized corn oil, metathesized cottonseed oil, metathesized olive oil, metathesized palm oil, metathesized peanut oil, metathesized safflower oil, metathesized sesame oil, metathesized soybean oil, metathesized sunflower oil, metathesized linseed oil, metathesized palm kernel oil, metathesized tung oil, metathesized jatropha oil, metathesized mustard oil, metathesized castor oil, metathesized derivatives of these oils, and mixtures thereof. In another embodiment, the metathesized natural oil is a metathesized animal fat, for example, metathesized lard, metathesized tallow, metathesized poultry fat, metathesized fish oil, metathesized derivatives of these oils, and mixtures thereof.

In certain embodiments, the metathesized natural oil has been "hydrogenated" (i.e., full or partial hydrogenation of the unsaturated carbon-carbon bonds in the metathesized natural oil) in the presence of a hydrogenation catalyst to form a hydrogenated metathesized natural oil. In one embodiment, the natural oil is partially hydrogenated before it is subjected to the metathesis reaction. In another embodiment, the natural oil is metathesized prior to being subjected to partial or full hydrogenation. In another embodiment, the natural oil is partially hydrogenated, metathesized, then either partially hydrogenated or hydrogenated to completion. In some embodiments, the hydrogenation step (either partial or full) of the metathesized natural oil may also occur after it is subjected to the metathesis reaction. Any known or future-developed hydrogenation catalysts may be used, alone or in combination with one or more additional catalysts. Non-limiting exemplary hydrogenation catalysts and process conditions are described in PCT/US2007/000610 and PCT/US2008/009635, pp. 47-51, incorporated by reference herein.

In some embodiments, the metathesized natural oil may be epoxidized. The metathesized natural oil may be epoxidized via any suitable peroxyacid. Peroxyacids (peracids) are acyl hydroperoxides and are most commonly produced by the acid-catalyzed esterification of hydrogen peroxide. Any peroxyacid may be used in the epoxidation reaction. Examples of hydroperoxides that may be used include, but are not limited to, hydrogen peroxide, tert-butylhydroperoxide, triphenylsilylhydroperoxide, cumylhydroperoxide, and preferably, hydrogen peroxide.

As used herein, the term "natural oil" may also include metathesized natural oils, fully and/or partially hydrogenated metathesized natural oils, and fully and/or partially hydrogenated natural oils, and epoxidized metathesized natural oils. Also as used herein, "MSBO" may refer to metathesized soybean oil, the term "HMSBO" may refer to hydrogenated metathesized soybean oil, the term "SBO" may refer to soybean oil, and the term "HSBO" may refer to hydrogenated soybean oil.

Suitable fatty acids of natural oils or hydrogenated and/or metathesized natural oils include, but are not limited to, aliphatic, aromatic, saturated, unsaturated, straight chain or branched, substituted or unsubstituted, fatty acids, and mono-, di-, tri-, and/or poly-acid variants thereof having carbon chain lengths of 6 to 36 carbon atoms, non-limiting examples of which include caproic acid, caprylic acid, capric acid, lauric acid, myristic acid, palmitic acid, oleic acid, linoleic acid, linolenic acid, stearic acid, arachic acid, erucic acid and behenic acid. The fatty acids used may be in the form of powders, beads, flakes or flocculated, as well as, extruded or granulated by other means as, for instance, obtained by cooling of an aqueous fatty acid emulsion below the melting point of that acid.

As used herein, the term "dropping point," "drop point," or "melting point" are terms that may refer to the temperature at which the wax sample begins to melt. The drop point may be measured using ASTM-D127-08 or the Mettler Drop Point FP80 system, incorporated by reference herein.

As used herein, the term "needle penetration" may refer to the relative hardness of the metallic soap composition. The needle penetration may be measured using ASTM-D1321-02a, incorporated by reference herein.

As used herein, the term "softening point" may refer to the point at which the metallic soap composition gradually and imperceptibly changes from solids to soft, viscous liquids. The softening point may be measured by ASTM D3104-99.

As used herein, the term "metallic soaps" or "metallic soap" or "metallic soap compositions" or "metallic soap composition" means at least one metallic soap composition which may be the salts of various metals, non-limiting examples of which include alkaline earth and alkali metals such as, without limitation, beryllium, magnesium, calcium, lithium, sodium, potassium, strontium and barium; transition metals, without limitation, such as titanium, vanadium, chromium, manganese, iron, cobalt, nickel, copper, zinc, zirconium, molybdenum, palladium, silver, cadmium, tungsten and mercury; and other metals such as aluminum, gallium, tin, iron, lead, and lanthanoid metals, all individually or in combinations thereof. For their manufacture, the alkoxides, oxides, hydroxides, carbonates, chlorides, and mixtures thereof of any of the aforementioned metals are found to be especially useful. In some embodiments, hydroxides of these aforementioned metals are preferred, and calcium hydroxide, strontium hydroxide, magnesium hydroxide, sodium hydroxide, and lithium hydroxide are more preferred.

Saponification Processes for Making Metallic Soap Compositions

I. Fusion Process

The metallic soap compositions may be produced via a fusion process (samples TT1 through TT10 and TT14 through TT24 referenced below). In the fusion process, an oil comprising one or more fatty acids or derivatives therefrom is added to a reactor and purged in a nitrogenous atmosphere at an elevated temperature of between about 70° C. to about 140° C., preferably about 90° C. to about 120° C. and most preferably about 95° C. to about 105° C., for between about 30-90 minutes, and preferably about 60 minutes. This oil is selected from the group consisting of: a metathesized natural oil, a hydrogenated metathesized natural oil, a hydrogenated natural oil, or a natural oil, or mixtures thereof. In some embodiments, the natural oil is soybean oil, the metathesized natural oil is metathesized soybean oil, the hydrogenated natural oil is hydrogenated soybean oil, and the hydrogenated metathesized natural oil is hydrogenated metathesized soybean oil. In some embodiments, the oil comprises up to 100 weight percent MSBO, and in some embodiments, the oil comprises up to 100 weight percent HMSBO, and in some embodiments, the oil comprises a mixture of up at about 50 weight percent MSBO and up to about 50 weight percent HMSBO, and in some embodiments, the oil comprises a mixture of up to about 12.5 weight percent SBO, up to about 12.5 weight percent HSBO, up to about 37.5 weight percent MSBO, and up to about 37.5 weight percent HMSBO, and in some embodiments, the oil comprises a mixture of up to about 25 weight percent MSBO and up to about 75 weight percent HMSBO, and in some embodiments, the oil comprises a mixture of up to about 12.5 weight percent SBO, up to about 37.5 weight percent HSBO, up to about 12.5 weight percent MSBO, and up to about 12.5 weight percent HMSBO, and in some embodiments, the oil comprises a mixture of up to about 6.25 weight percent SBO, up to about 18.75 weight percent HSBO, up to about 18.75 weight percent MSBO, and up to about 56.25 weight percent HMSBO, and in some embodiments, the oil comprises a mixture of up to about 56.25 weight percent SBO, up to about 18.75 weight percent HSBO, up to about 18.75 weight percent MSBO, and up to about 6.25 weight percent HMSBO, and in some embodiments, the oil comprises a mixture of up to about 18.75 weight percent SBO, up to about 56.25 weight percent HSBO, up to about 6.25 weight percent MSBO, and up to about 18.75 weight percent HMSBO, and in some embodiments, the oil comprises up to about 100 weight percent SBO. To this oil, at least one metal compound, such as a metal oxide, metal hydroxide, metal carbonate or metal alkoxide, preferably a metal hydroxide, is introduced, and the oil and the metal compound are reacted by fusing them at a temperature above the melting point of the metallic soap composition to be formed, with this temperature typically between about 200° C. to about 400° C., more preferably about 275° C. to about 350° C., and most preferably about 290° C. to about 310° C., for a period of about 3 and 6 hours, and preferably about 4 hours, with stirring. The degree of saponification for this fusion process is at least a partial saponification, wherein the degree of saponification is about 10% to about 100%, preferably about 25% to about 90%, more preferably about 30% to about 65%, and most preferably about 35% to about 45%, as measured by FTIR. For the purposes of analyzing the degree of saponification of a given material, it is possible to utilize FTIR for such analysis, as described at various points herein. The peaks of interest when analyzing these materials are the stretching peak attributed to carbonyl of the metallic soap composition (~1530-1550 cm-1), and the stretching peak attributed to the ester carbonyl (~1745 cm-1) in the unsaponified oil. A calibration curve can be made by creating known ratio mixtures of metallic soap and ester and plotting their known ratios versus the relative signal intensity of the two stretching peaks.

Any volatile or light compounds from the natural oil are distilled off and collected, and any carbon dioxide gas or water by-products, along with any free glycerol component that is also produced as a byproduct, and are expelled out of the reaction system, where the molten metallic soap composition is removed from the system. This molten metallic soap composition is then poured from the reactor into metal pans and allowed to cool to room temperature, and if needed, recovery steps such as filtration, decanting, and centrifugation, and the like, and any washing and/or drying steps may be applied.

Metallic soap compositions produced by the fusion process herein comprise a hardness, as measured by needle penetration, between about 5 dmm to about 250 dmm, and preferably between about 15 dmm to about 75 dmm, and most preferably between about 45 dmm to about 55 dmm. The metallic soap compositions produced by the fusion process herein comprise a drop point of between about 50° C. and about 170° C., more preferably between about 70° C. and about 140° C., and most preferably between about 75° C. and about 105° C.

II. Aqueous Process

The metallic soap compositions may be produced via an aqueous process (samples TT11 through TT13 and samples TT25 through TT28 referenced below). In the aqueous process, an oil comprising one or more fatty acids is dissolved in water and then neutralized with at least one metal compound such as a metal alkoxide, metal oxide, metal hydroxide, or metal carbonate, preferably a metal hydroxide, and most preferably sodium hydroxide, potassium hydroxide or calcium hydroxide, individually or in combinations thereof. This oil is selected from the group consisting of: a metathesized natural oil, a hydrogenated metathesized natural oil, a hydrogenated natural oil, or a natural oil, or mixtures thereof. In some embodiments, the oil comprises up to 100 weight percent MSBO. This mixture is heated in a reactor at a temperature between about 70° C. to about 150° C., preferably about 75° C. to about 125° C., and most preferably about 95° C., and this mixture is stirred and/or agitated for some period of time, up to about 5 hours, and preferably about 1 to 3 hours. In some embodiments, the metallic soap composition precipitates from the solution and is recovered from the reactor via any suitable means known in the art, such as filtering, decanting, centrifuging, and the like, along with washing, drying, and thereafter cooling, as needed. Along with the metallic soap composition that is produced, which may be a first metallic soap composition for this aqueous process in some embodiments, a free glycerol component is also produced as a byproduct. In some embodiments, an inorganic metal salt may be added to the preceding metallic soap composition for at least one ion exchange reaction, prior to the aforementioned cooling, wherein such inorganic metal salt is a metal hydroxide such as magnesium hydroxide, strontium hydroxide, and calcium hydroxide, and most preferably calcium hydroxide, or a metal chloride, preferably zinc chloride or calcium chloride. This ion exchange reaction occurs at a temperature between about 50° C. to about 150° C., preferably about 65° C. to about 125° C., and most preferably about 70° C. to about 100° C. The resulting metallic soap composition is recovered via any suitable means known in the art, such as filtering, decanting, centrifuging, and the like, with washing, drying, and thereafter cooling as needed, to produce another metallic soap composition, which may be a second metallic soap composition for this aqueous process in some embodiments. Along with the metallic soap composition that is produced, a free glycerol component and saltwater is also produced as a byproduct. Reaction times are up to about 5 hours, and preferably about 1 to 3 hours for the saponification and up to about 3 hours, and preferably about 1 hour for the at least one ion exchange reaction. The degree of saponification for these aqueous processes is at least a partial saponification, wherein the degree of saponification is about 10% to about 100%, more preferably about 70% to about 100%, and most preferably about 95% to about 100%.

In some embodiments, a fatty acid derived from a metathesized natural oil can be neutralized with a metal oxide, metal alkoxide, metal hydroxide or metal carbonate, preferably a metal hydroxide, and most preferably either sodium hydroxide or potassium hydroxide. The resulting metallic soap composition is then reacted with a stoichiometric equivalent (compared to the metal hydroxide amount) of phosphoric acid. The fatty acid is then mixed with water with a stoichiometric equivalent (based off the initial equivalents of ester in the oil) of metal hydroxide to produce a metallic soap composition.

The above-described processes may be carried out in batches, continuously or semi-continuously. The batch process begins with the reagents and ends when metallic soap compositions are produced, beginning again by adding new reagents (natural oils together with metal hydroxides and water). The continuous process, however, is not interrupted, except for periodic maintenance and cleaning of the facilities. The natural fats and/or natural oils are continually added, together with metal compound and the water sequentially, and the metallic soap composition rich in fatty acids is obtained without stopping. The semi-continuous process is a mixture of the above. It is a continuous process, but only lasts for a certain number of pre-programmed cycles.

The melting point of the metallic soap compositions depends on the extent of saponification of the resulting metallic soap product. As the extent of saponification increases, the melting point of the metallic soap composition also increases. The melting point of the metallic soap compositions also depends on the degree of unsaturation in the aliphatic hydrocarbon anions of the fatty acid employed. The higher the saturation of the aliphatic hydrocarbon anions, then the higher the melting point of the metallic soap composition. For a given chain length or number of carbon atoms in a fatty acid aliphatic hydrocarbon anion, the greater the number of carbon-carbon double bonds in the chain, the lower will be the melting point.

In some embodiments, the metallic soap compositions may also be crosslinked via an initiator composition that is capable of initiating cure at a temperature preferably at about 130° C. or less. Generally, the initiator composition includes both an initiator compound and an activator or promoter. The initiator and the activator or promoter work in tandem to start initiation at a desired processing temperature. General examples of initiators include various organic or peroxides and peracids. Non-limiting examples of initiators include, without limitation, benzoyl peroxide, methyl ethyl ketone hydroperoxide, and cumene hydroperoxide, and preferably benzoyl peroxide. For the preferred benzoyl peroxide, non-limiting examples of activators such as cobalt octoate, dimethyl aniline, cobalt naphthenate, and cobalt 2-ethylhexanoate, and preferably cobalt naphthenate, may be added, resulting in initiator compositions capable of curing the metallic soap composition at a temperature from about room temperature up to about 130° C.

The metallic soap compositions may be converted into flakes, noodles, blocks, bars, powder, pellets, extrusions, granulates, or any other suitable form or shape by methods known in the art. Further the metallic soaps have use in various applications, including as adhesives, and coatings having corrosion resistance when applied to certain surfaces or materials, as described below. It is also contemplated that the metallic soap compositions can have uses as asphalt modifiers.

The metallic soap compositions may be used in various additional non-limiting applications such as stabilizers, lubricants, greases, water-repellents, thickeners for oils or other organic media, coating agents, as catalysts in chemical reactions, as additives for rubber to improve adhesiveness or bonding of rubber with various substrates, as gelling agents, cosmetic formulations, flattening agents, mold/mildew prevention agents, PVC stabilizers, nucleating agents, and as driers for painting/varnish/lacquer/ink applications.

EXAMPLE, COMPARATIVE EXAMPLE, AND APPLICATION TESTING

A. Example (Sample ID TT1) 1500.0 g of metathesized soybean oil (MSBO) [3.42 mmol/g COOR] was added to the reactor and sparged at 100° C. for one hour with dry nitrogen. 80.0 g Ca(OH)$_2$ [1.08 mol] was then added and the reactor was sealed with a positive purge of nitrogen. The mixture was heated to 300° C. and the volatile and light compounds in the MSBO were distilled off and collected. The reaction proceeded for 4 hours with stirring at ambient. Reaction ratios were calculated for a ~40% degree of saponification. Degree of saponification, as determined by IR analysis, was 42%. Finished samples were poured from the reactor into metal pans and allowed to cool to room temperature. Other properties determined are listed in Table 1.

(Sample ID TT2) 1500.0 g MSBO was added to the reactor and sparged at 100° C. for one hour with dry nitrogen. 40.0 g Ca(OH)$_2$ was then added and the reactor was sealed with a positive purge of nitrogen. The mixture was heated to 300° C. and the volatile and light compounds in the MSBO were distilled off and collected. The reaction proceeded for 4 hours with stirring at ambient. Degree of saponification, as determined by IR analysis, was 21%. Finished samples were poured from the reactor into metal pans and allowed to cool to room temperature.

(Sample ID TT3) 1500.0 g MSBO was added to the reactor and sparged at 100° C. for one hour with dry nitrogen. 120.0 g Ca(OH)$_2$ was then added and the reactor was sealed with a positive purge of nitrogen. The mixture was heated to 300° C. and the volatile and light compounds in the MSBO were distilled off and collected. The reaction proceeded for 4 hours with stirring at ambient. Degree of saponification, as determined by IR analysis, was 63%. Finished samples were poured from the reactor into metal pans and allowed to cool to room temperature.

(Sample ID TT4) 1500.0 g MSBO was added to the reactor and sparged at 100° C. for one hour with dry nitrogen. 160.0 g Ca(OH)$_2$ was then added and the reactor was sealed with a positive purge of nitrogen. The mixture was heated to 300° C. and the volatile and light compounds in the MSBO were distilled off and collected. The reaction proceeded for 4 hours with stirring at ambient. Degree of saponification, as determined by IR analysis, was 84%. Finished samples were poured from the reactor into metal pans and allowed to cool to room temperature.

(Sample ID TT5) 1500.0 g HMSBO was added to the reactor and sparged at 100° C. for one hour with dry nitrogen. 200.04 g Ca(OH)$_2$ was then added and the reactor was sealed with a positive purge of nitrogen. The mixture was heated to 300° C. and the volatile and light compounds in the HMSBO were distilled off and collected. The reaction proceeded for 4 hours with stirring at ambient. Degree of saponification, as determined by IR analysis, was 100%. Finished samples were poured from the reactor into metal pans and allowed to cool to room temperature (Sample ID TT6) Varying feedstock was examined by adding 187.5 g of soybean oil (SBO), 187.5 g hydrogenated soybean oil (HSBO), 562.5 g MSBO, 562.5 g HMSBO to the reactor and purging with dry nitrogen at 100° C. for one hour. 120.0 g Ca(OH)$_2$ was added and the reactor was sealed with a positive purge of nitrogen. The mixture was heated to 300° C. and the volatile and light compounds in the reaction mixture were distilled off and collected. Degree of saponification, as determined by IR analysis, was 63%. The reaction proceeded for 4 hours with stirring at ambient pressure.

(Sample ID TT7) 1500.0 g MSBO was added to the reactor and sparged at 100° C. for one hour with dry nitrogen. 66.02 g Mg(OH)$_2$ was then added and the reactor was sealed with a positive purge of nitrogen. The mixture was heated to 300° C. and the volatile and light compounds in the MSBO were distilled off and collected. The reaction proceeded for 4 hours with stirring at ambient. Degree of saponification, as determined by IR analysis, was 44%. Finished samples were poured from the reactor into metal pans and allowed to cool to room temperature.

(Sample ID TT8) 1500.0 g MSBO was added to the reactor and sparged at 100° C. for one hour with dry nitrogen. 300.83 g Sr(OH)$_2$ was then added and the reactor was sealed with a positive purge of nitrogen. The mixture was heated to 300° C. and the volatile and light compounds in the MSBO were distilled off and collected. The reaction proceeded for 4 hours with stirring at ambient. Degree of saponification, as determined by IR analysis, was 20%. Finished samples were poured from the reactor into metal pans and allowed to cool to room temperature.

(Sample ID TT9) 750.0 g MSBO and 750.0 g HMSBO was added to the reactor and sparged at 100° C. for one hour with dry nitrogen. 83.9 g Ca(OH)$_2$ was then added and the reactor was sealed with a positive purge of nitrogen. The mixture was heated to 300° C. and the volatile and light compounds in the MSBO and HMSBO mix were distilled off and collected. The reaction proceeded for 4 hours with stirring at ambient. Degree of saponification, as determined by IR analysis, was 40%. Finished samples were poured from the reactor into metal pans and allowed to cool to room temperature (Sample ID TT10) 375.0 g MSBO and 1125.0 g HMSBO was added to the reactor and sparged at 100° C. for one hour with dry nitrogen. 83.9 g Ca(OH)$_2$ was then added and the reactor was sealed with a positive purge of nitrogen. The mixture was heated to 300° C. and the volatile and light compounds in the MSBO and HMSBO mix were distilled off and collected. The reaction proceeded for 4 hours with stirring at ambient. Degree of saponification, as determined by IR analysis, was 40%. Finished samples were poured from the reactor into metal pans and allowed to cool to room temperature.

(Sample ID TT14) 187.5 g SBO, 562.5 g HSBO, 187.5 g MSBO, and 562.5 g HMSBO was added to the reactor and sparged at 100° C. for one hour with dry nitrogen. 83.9 g Ca(OH)$_2$ was then added and the reactor was sealed with a positive purge of nitrogen. The mixture was heated to 300° C. and the volatile and light compounds in the SBO, HSBO, MSBO, and HMSBO mix were distilled off and collected. The reaction proceeded for 4 hours with stirring at ambient. Degree of saponification, as determined by IR analysis, was 40%. Finished samples were poured from the reactor into metal pans and allowed to cool to room temperature.

(Sample ID TT15) 93.75 g SBO, 281.25 g HSBO, 281.25 g MSBO, and 843.75 g HMSBO was added to the reactor and sparged at 100° C. for one hour with dry nitrogen. 83.9 g Ca(OH)$_2$ was then added and the reactor was sealed with a positive purge of nitrogen. The mixture was heated to 300° C. and the volatile and light compounds in the SBO, HSBO, MSBO, and HMSBO mix were distilled off and collected. The reaction proceeded for 4 hours with stirring at ambient. Degree of saponification, as determined by IR analysis, was 40%. Finished samples were poured from the reactor into metal pans and allowed to cool to room temperature.

(Sample ID TT16) 750.0 g MSBO, and 750.0 g HMSBO was added to the reactor and sparged at 100° C. for one hour with dry nitrogen. 83.9 g Ca(OH)₂ was then added and the reactor was sealed with a positive purge of nitrogen. The mixture was heated to 300° C. and the volatile and light compounds in the MSBO and HMSBO mix were distilled off and collected. The reaction proceeded for 4 hours with stirring at ambient. Degree of saponification, as determined by IR analysis, was 40%. Finished samples were poured from the reactor into metal pans and allowed to cool to room temperature.

(Sample ID TT17) 375.0 g MSBO, and 1125.0 g HMSBO was added to the reactor and sparged at 100° C. for one hour with dry nitrogen. 83.9 g Ca(OH)₂ was then added and the reactor was sealed with a positive purge of nitrogen. The mixture was heated to 300° C. and the volatile and light compounds in the MSBO and HMSBO mix were distilled off and collected. The reaction proceeded for 4 hours with stirring at ambient. Degree of saponification, as determined by IR analysis, was 40%. Finished samples were poured from the reactor into metal pans and allowed to cool to room temperature.

(Sample ID TT18) 375.0 g MSBO, and 1125.0 g HMSBO was added to the reactor and sparged at 100° C. for one hour with dry nitrogen. 120.0 g Ca(OH)₂ was then added and the reactor was sealed with a positive purge of nitrogen. The mixture was heated to 300° C. and the volatile and light compounds in the MSBO and HMSBO mix were distilled off and collected. The reaction proceeded for 4 hours with stirring at ambient. Degree of saponification, as determined by IR analysis, was 60%. Finished samples were poured from the reactor into metal pans and allowed to cool to room temperature.

(Sample ID TT19) 843.75 g SBO, 281.25 g HSBO, 281.25 g MSBO, and 93.75 g HMSBO was added to the reactor and sparged at 100° C. for one hour with dry nitrogen. 160.0 g Ca(OH)₂ was then added and the reactor was sealed with a positive purge of nitrogen. The mixture was heated to 300° C. and the volatile and light compounds in the SBO, HSBO, MSBO, and HMSBO mix were distilled off and collected. The reaction proceeded for 4 hours with stirring at ambient. Degree of saponification, as determined by IR analysis, was 80%. Finished samples were poured from the reactor into metal pans and allowed to cool to room temperature.

(Sample ID TT20) 281.25 g SBO, 843.75 g HSBO, 93.75 g MSBO, and 281.25 g HMSBO was added to the reactor and sparged at 100° C. for one hour with dry nitrogen. 80.0 g Ca(OH)₂ was then added and the reactor was sealed with a positive purge of nitrogen. The mixture was heated to 300° C. and the volatile and light compounds in the SBO, HSBO, MSBO and HMSBO mix were distilled off and collected. The reaction proceeded for 4 hours with stirring at ambient. Degree of saponification, as determined by IR analysis, was 40%. Finished samples were poured from the reactor into metal pans and allowed to cool to room temperature.

(Sample ID TT21) 111.1 g MSBO was added to the reactor and sparged at 100° C. for one hour with dry nitrogen. 5.93 g Ca(OH)₂ was then added and the reactor was sealed with a positive purge of nitrogen. The mixture was heated to 300° C. and the volatile and light compounds in the MSBO were distilled off and collected. The reaction proceeded for 4 hours with stirring at ambient. Degree of saponification, as determined by IR analysis, was 40%. Finished samples were poured from the reactor into metal pans and allowed to cool to room temperature.

(Sample ID TT22) 1000.0 g MSBO was added to the reactor and sparged at 100° C. for one hour with dry nitrogen. 80.02 g Ca(OH)₂ was then added and the reactor was sealed with a positive purge of nitrogen. The mixture was heated to 300° C. and the volatile and light compounds in the MSBO were distilled off and collected. The reaction proceeded for 4 hours with stirring at ambient. Degree of saponification, as determined by IR analysis, was 60%. Finished samples were poured from the reactor into metal pans and allowed to cool to room temperature.

(Sample ID TT23) 1283.7 g MSBO was added to the reactor and sparged at 100° C. for one hour with dry nitrogen. 71.8 g Ca(OH)₂ was then added and the reactor was sealed with a positive purge of nitrogen. The mixture was heated to 300° C. and the volatile and light compounds in the MSBO were distilled off and collected. The reaction proceeded for 4 hours with stirring at ambient. Degree of saponification, as determined by IR analysis, was 40%. Finished samples were poured from the reactor into metal pans and allowed to cool to room temperature.

(Sample ID TT24) 1472.4 g SBO was added to the reactor and sparged at 100° C. for one hour with dry nitrogen. 124.0 g Ca(OH)₂ was then added and the reactor was sealed with a positive purge of nitrogen. The mixture was heated to 300° C. and the volatile and light compounds in the SBO were distilled off and collected. The reaction proceeded for 4 hours with stirring at ambient. Degree of saponification, as determined by IR analysis, was 65%. Finished samples were poured from the reactor into metal pans and allowed to cool to room temperature.

TABLE 1

Metallic soap compositions made by fusion process

| Sample | SBO (g) | HSBO (g) | MSBO (g) | HMSBO (g) | Cation Used | Amount Base (g) | Degree of Saponification (%) | Needle Penetration (dmm) | Drop Point ° C. |
|---|---|---|---|---|---|---|---|---|---|
| TT1 | | | 1500 | | Ca | 80 | 42 | 50 | 81.06 |
| TT2 | | | 1500 | | Ca | 40 | 21 | 245 | 78.39 |
| TT3 | | | 1500 | | Ca | 120 | 63 | 16 | 133.61 |
| TT4 | | | 1500 | | Ca | 160 | 84 | 6 | NA |
| TT5 | | | | 1500 | Ca | 200.04 | 100 | NA | NA |
| TT6 | 187.5 | 187.5 | 562.5 | 562.5 | Ca | 120 | 63 | 19.3 | 101.94 |
| TT7 | | | 1500 | | Mg | 66.02 | 44 | 56 | 77.33 |
| TT8 | | | 1500 | | Sr | 300.83 | 20 | 72 | 79.94 |
| TT9 | | | 750 | 750 | Ca | 83.9 | 40 | 24 | 93.16 |
| TT10 | | | 375 | 1125 | Ca | 83.9 | 40 | 13 | 140.05 |
| TT14 | 187.5 | 562.5 | 187.5 | 562.5 | Ca | 83.9 | 40 | 15 | 117.8 |

TABLE 1-continued

Metallic soap compositions made by fusion process

| Sample | SBO (g) | HSBO (g) | MSBO (g) | HMSBO (g) | Cation Used | Amount Base (g) | Degree of Saponification (%) | Needle Penetration (dmm) | Drop Point ° C. |
|---|---|---|---|---|---|---|---|---|---|
| TT15 | 93.75 | 281.25 | 281.25 | 843.75 | Ca | 83.9 | 40 | 17 | 135.3 |
| TT16 | | | 750 | 750 | Ca | 83.9 | 40 | 24 | 93.2 |
| TT17 | | | 375 | 1125 | Ca | 83.9 | 40 | 13 | 140.1 |
| TT18 | | | 375 | 1125 | Ca | 120 | 60 | 10.1 | 109 |
| TT19 | 843.75 | 281.25 | 281.25 | 93.75 | Ca | 160 | 80 | 20.8 | 98.7 |
| TT20 | 281.25 | 843.75 | 93.75 | 281.25 | Ca | 80 | 40 | 22.8 | 102.3 |
| TT21 | | | 111.1 | | Ca | 5.93 | 40 | NA | NA |
| TT22 | | | 1000 | | Ca | 80.02 | 60 | NA | NA |
| TT23 | | | 1283.7 | | Ca | 71.8 | 40 | 52 | NA |
| TT24 | 1472.4 | | | | Ca | 124.0 | 65 | 72 | NA |

NA = not available (Sample ID TT11) 250.0 g of stripped MSBO [3.42 mmol/g COOR] and 56.1 g KOH [1 mol] diluted to 400.0 g with water were added to the reactor. The mixture was heated to 95° C. and stirred for 2 hours. Following formation of the potassium soap 37.1 g Ca(OH)$_2$ [0.5 mol] was added to the reactor, to carry out an ion exchange, and the mixture was stirred at 95° C. and for 1 hour. Reaction ratios were calculated for 100% saponification. The degree of saponification, as determined by IR analysis, was 99% after two hours of reaction. Sample ID TT11 was allowed to cool and then removed from the reactor as a highly basic white slurry.

(Sample ID TT12) 500.0 g of stripped MSBO [3.42 mmol/g COOR] and 70.0 g NaOH [1.75 mol] diluted to 400.0 g with water were added to the reactor. The mixture was heated to 95° C. and stirred for 2 hours. Reaction ratios were calculated for 100% saponification. The degree of saponification, as determined by IR analysis, was 99% after two hours of reaction. Sample ID TT12 was allowed to cool and then removed from the reactor as a pliable solid. The water level of product was 21%.

The synthesis of zinc soap (Sample ID TT13) entailed adding a stoichiometric equivalent of ZnCl$_2$ [0.875 mol] to a dilute solution of the sodium soap, as prepared for Sample TT12. This ion exchange reaction occurs in an aqueous environment at 75° C. for 1 hour. The resulting solid was rinsed, filtered, dried, and cooled, yielding a saltwater and glycerol solution and the final zinc soap product. The resulting product was a fine powder, as shown in Table 2 below. Differential Scanning calorimetry (DSC) analysis indicated two transitions, at 95° C. and at 125° C. As commonly understood, DSC essentially records and charts the melting points or melting range of the various components of a composition. The height of individual peaks are generally in proportion to the approximate ratios of the amount of components present.

TABLE 2

| | DSC Melt Point (° C.) | Wt. % H$_2$O | Product Description |
|---|---|---|---|
| TT12 | NA* | 21 | Pliable white solid (*not dried) |
| TT13 | 92.5 (125) | 5 | Fine white powder |

In certain embodiments, the metallic soap compositions may possess properties equal to or improved over commercial metallic soaps for various adhesive applications, as described in the application testing below. These adhesive applications may be suitable as a standalone hot melt adhesive composition. In some embodiments, the metallic soap compositions can behave as an adhesive without the addition of secondary tackifying agents. In some embodiments, the metallic soap composition is a single component material that adheres to multiple surfaces and/or substrates, (including, but not limited to, polymer films such as polyethylene terephthalate (PET) and biaxially oriented polypropylene (BOPP); woven and non-woven fabrics; metals such as aluminum, copper, lead, gold and the like; paper, glass, ceramics, stone, wood and composite materials comprising one or more of these materials), is generally highly hydrophobic, generally insoluble in many organic solvents, and may be applied to the aforesaid surfaces and/or substrates by any method known in the art, including, but not limited to knife coating, roll coating, gravure coating, and curtain coating.

In certain embodiments, the metallic soap compositions may be formulated by blending with various additives, non-limiting examples of which include plasticizers, surfactants, fillers, antioxidants, pigments, and preservatives.

In certain embodiments, the metallic soap compositions may optionally be blended with adhesive components known in the art, which may include, but are not limited to, polyurethanes; poly ether amides block copolymers; polyethylene copolymers, including, but not limited to, polyethylene-vinyl acetate, polyethylene-butyl acrylate, polyethylene-2-ethyl hexyl acrylate, polyethylene-methyl acrylate, polyethylene-acrylic acid, polyethylene oxide and its copolymers; amorphous poly-alpha olefins and the functionalized copolymers thereof; polylactide and copolymers; polyamides; polyesters and co-polyesters; polyester block copolymers; functionalized polyesters and co-polyesters including, but not limited to, sulfonated polyesters; polyacrylic compositions; polyvinyl ethers; poly caprolactones and copolymers; epoxides and copolymers thereof including, but not limited to, urethane-epoxides; isoprene compositions; poly-isobutylene and functionalized types; poly-butadiene and functionalized types; poly-butyl, polybutene and functionalized types; styrene block copolymers including, but not limited to, functionalized types such as maleic modified styrene ethylene butadiene styrene (m-SEBS), and mixtures thereof.

In certain embodiments, the metallic soap compositions may have adhesive applications that may include, but are not limited to, skin-contact medical applications, surgical tapes, bandages, wound care, operation tapes and drapes, hygiene applications including feminine care products, box sealing tapes, masking applications, low fogging, automotive interior applications including foam gaskets, instrument displays, sound deadening, trim bonding, sealants, chalks, general pressure sensitive adhesives, semi-pressure sensitive adhesives, building & hydroxyl ion adhesives, assembly adhesives, adhesive films and membranes, bottle labeling, water soluble adhesives, laminating adhesives, adhesives for flexible packaging, concrete curing compounds, mounting tapes, double sided tapes, electrical tapes, permanent and removable labels, filmic labels, pressure sensitive adhesives for the graphic industry, labels for laser printers, insulation tapes, primer compounds, tie layers, road marking adhesives, inks, mounting tapes, labels for chemicals, (including for sea water resistance), and labeling for pharmaceuticals and cosmetics, etc.

In certain embodiments, the metallic soap compositions may possess properties equal to or improved over commercial metallic soaps for various coatings applications, as described in the application testing below. As a coating on at least one solid surface(s) or material(s), non-limiting examples of which include various kinds of surfaces such as glass, metal surfaces such as aluminum, and alloy surfaces such as steel, 416 stainless, and brass, the metallic soap compositions may be applied as a single anti-corrosion layer or may be combined with a top layer paint or coating or may be part of a formulated coating such as a latex or oil-based paint. The metallic soap compositions may be applied by any conventional high temperature and/or high velocity sprays, including, but not limited to, high velocity high temperature spray, thermal spray, plasma spray, fluidized bed, hot melt or electrostatic spray, electrostatic powder coating method, spray liquid coating, or any coating method that is commonly used for conventional metallic soaps.

B. Comparative Example

The purpose of comparing metallic soaps made from different starting materials was to gain insight into the benefits provided by utilizing metathesized natural oil as opposed to the neat (not metathesized) natural oil itself. Testing involved in this analysis consisted of adhesion tests (ASTM and Instron) and DSC/DMA analysis of melt/glass transition temperatures. Basic physical properties (Drop Point, Needle Penetration, Softening Point) of each material were fairly similar.

The results of this testing, in Table 3 below, showed that MSBO based materials had improved material properties than those based off of SBO, making them more suitable as adhesive materials and coatings.

TABLE 3

| Starting Material | Drop Point (° C.) | Needle Penetration (dmm) | Viscosity (cP) | Softening Point (° C.) |
|---|---|---|---|---|
| TT23 | 100.11 | 52 | 77.5k | 81.27 |
| TT24 | 87.33 | 72 | 8.5k | 48.27 |

Drop Point, Needle Penetration, Viscosity (100° C., cP = centipoise), Softening Point The SBO sample (TT24) utilized in this testing was not at the same level of conversion/saponification as the sample of MSBO. The MSBO sample used (sample TT1 in Table 1) was a 40% saponified material while the SBO sample used was a 65% saponified material. When initial calculations were used (based off mass rather than molar equivalents) the samples were set up on an equal basis; however, after further analysis, utilizing moles COOR, far different numbers for degree of saponification were yielded. As such the saponification of SBO was carried out at 40% yielding a product that was roughly the consistency of standard petrolatum. Such a material was obviously unsuitable as a standalone adhesive.

C. Application Testing

Adhesion Results

Based on observation, the benefits of a material based off of MSBO were due to the presence of oligomerized diester/diacid groups within the mixture. The presence of these compounds should allow for low-level oligomerization of the sample mixture as opposed to the terminal chains that would exist in a material synthesized from SBO (36 carbon maximum chain length). Building off of this observation, one can also expect that materials made from SBO, while sticky and/or tacky, will not likely have the structural strength that an oligomerized material will have. The results of the adhesion tests can be seen in the following Tables 4 and 5 below. All materials were made via the fusion process described above.

TABLE 4

| Starting Material | Metal | Film Thickness (mil) | Max Pressure[1] (psi) |
|---|---|---|---|
| TT23 (MSBO) | 6061 Al | 4 | 68 |
| TT23 (MSBO) | CR Steel | 4 | 121 |
| TT24 (SBO) | 6061 Al | 4 | 41 |
| TT24 (SBO) | CR Steel | 4 | 77 |

[1]ASTM D 4541: Pull-off adhesion test

TABLE 5

| Starting Material | Avg. Max Load (kilogram force "kgf") | STD Max Load (kgf) | Adhesive Strength (psi) | Mode of Failure |
|---|---|---|---|---|
| TT23 (MSBO) | 21.817 | 2.927 | 177 | Adhesive |
| TT24 (SBO) | 10.635 | 1.404 | 86 | Cohesive |
| Gorilla Glue[2] | 21.593 | 4.146 | 175 | Adhesive |
| Krazy Glue[3] | 5.474 | 2.806 | 44 | Adhesive |

Instron test conducted by pulling apart 15 mm aluminum scanning electron microscopy (SEM) stages
[2]Gorilla Glue ®, a polyurethane adhesive manufactured by Gorilla Glue Company of Cincinnati, Ohio
[3]Krazy Glue ® (All Purpose Instant Krazy Glue), a cyanoacrylate adhesive manufactured by Krazy Glue of Columbus, Ohio The results of the assorted adhesion tests follow along with the expectation previously stated that the oligomeric materials should be stronger than a material with up to 36 carbon chains as its longest constituents. While the metallic soap of sample TT24 was strong in tension, it appeared to be quite weak under shear. This was not entirely unexpected from a flexible rubber-like material. Surprisingly, the metallic soap compositions (starting material MSBO) performed much better on the tape test on steel than it did on aluminum. This was likely due to the inherent surface roughness (visible) of the cold rolled steel as opposed to the smooth surface of the aluminum. Overall, the metallic soap composition samples made from MSBO as starting material were far superior to metallic soap made from SBO under loads as an adhesive material. The increased strength of MSBO based metallic soap compositions was due primarily to the presence of a metathesized backbone as opposed to the stearic/oleic backbone found in SBO. Also, the materials based off of SBO tend to fracture through the material to be adhered rather than fracturing at the adhesive interface.

Also as shown in Table 5, the metallic soap compositions performed comparably to Gorilla Glue® and much better than Krazy Glue® in metal-to-metal (aluminum to aluminum) adhesion.

In addition to the fusion process metallic soap compositions described above, the aqueous process metallic soap compositions described below (Samples TT25-TT28) were also suitable coating and adhesive materials. The reactions for producing these samples were carried out using the same reaction conditions as for examples TT12 and TT13, with varying amounts and types of natural oils, metal compounds, and inorganic metal salts, as set forth in Table 6 below. The aqueous process samples (Samples TT25-TT28) were applied to metal panels, consisting of Type R steel panels and Type A aluminum panels, available from Q-Panel, Cleveland, Ohio, and were coated using an Eastwood Hot Coat system and the metallic soap coating was annealed at 200° C. for 20 min. The coatings were continuous with occasional pock marks and were measured to be 50-60 μm. Adhesion tests were performed on each panel in accordance with ASTM D4541. All of the test panels had good or excellent adhesion strength (rating 3B, 4B, or 5B). The results for these adhesion tests are shown below in Table 6.

TABLE 6

|      | MSBO (g) | HMSBO (g) | NaOH (g) | ZnCl$_2$(g) | CaCl$_2$(g) | Material | Adhesion Strength (psi) | Adhesion Rating (5B-0B) |
|------|------|------|------|------|------|------|------|------|
| TT25 | 500  |      | 78   | 266  |      | Al   | 62   | 4B   |
|      |      |      |      |      |      | Steel| 76   | 5B   |
| TT26 | 500  |      | 78   |      | 216  | Al   | 45   | 3B   |
|      |      |      |      |      |      | Steel| 61   | 3B   |
| TT27 |      | 500  | 72   | 243  |      | Al   | 50   | 5B   |
|      |      |      |      |      |      | Steel| 48   | 4B   |
| TT28 |      | 500  | 72   |      | 198  | Al   | 47   | 5B   |
|      |      |      |      |      |      | Steel| 47   | 5B   |

Anti-Corrosion Testing and Additional Adhesion Testing on Materials

To demonstrate the advantages of a variety of formulations of the metallic soap compositions, steel and aluminum panels were coated with various examples of metallic soap compositions made with MSBO and/or a combination of MSBO, HMSBO, HSBO, and SBO in formulations similar to those listed in Table 1. The metal panels, consisting of Type R steel panels and Type A aluminum panels, available from Q-Panel, Cleveland, Ohio, were coated using an Eastwood Hot Coat system and the metallic soap coating was annealed at 200° C. for 20 min. The coatings were continuous with occasional pock marks and were measured to be 50-60 μm.

The resulting coated panels were conditioned in an environmental chamber by Cincinnati Sub-zero Testing Services, Cincinnati, Ohio, for 7 days in a neutral salt fog at 35° C. per method ASTM B-117-03. After environmental conditioning, the panel coatings were evaluated for corrosion resistance in accordance with ASTM D1654 and adhesion tests were performed on each panel in accordance with ASTM D4541 and D3359. Six of the twelve formulations tested received top tier ratings (rating 9 or 10) for lack of corrosion on both steel and aluminum. Twenty of the 24 test panels had good or excellent adhesion strength (rating 3B, 4B or 5B). Nineteen of the 24 test panels had good or excellent adhesion ratings. The test panel ratings and strength values are listed in Table 7 below.

TABLE 7

Corrosion Test Panel Results
Neutral Salt Fog, 35° C., 7 days

|      | Material | Corrosion Rating (10-1) | Adhesion Strength (psi) | Adhesion Rating (5B-0B) |
|------|------|------|------|------|
| TT2  | Aluminum | 9  | 77  | 2B |
|      | Steel    | 9  | 134 | 4B |
| TT3  | Aluminum | 9  | 47  | 3B |
|      | Steel    | 8  | 82  | 3B |
| TT6  | Aluminum | 7  | 56  | 3B |
|      | Steel    | 9  | 68  | 4B |
| TT14 | Aluminum | 7  | 56  | 1B |
|      | Steel    | 8  | 55  | 3B |
| TT15 | Aluminum | 9  | 57  | 1B |
|      | Steel    | 9  | 66  | 3B |
| TT16 | Aluminum | 9  | 56  | 5B |
|      | Steel    | 9  | 78  | 4B |
| TT17 | Aluminum | 9  | 53  | 4B |
|      | Steel    | 9  | 70  | 3B |
| TT18 | Aluminum | 10 | 56  | 0B |
|      | Steel    | 9  | 67  | 3B |
| TT19 | Aluminum | 4  | 54  | 3B |
|      | Steel    | 8  | 67  | 3B |

TABLE 7-continued

Corrosion Test Panel Results
Neutral Salt Fog, 35° C., 7 days

|      | Material | Corrosion Rating (10-1) | Adhesion Strength (psi) | Adhesion Rating (5B-0B) |
|------|------|------|------|------|
| TT20 | Aluminum | 8  | 53  | 4B |
|      | Steel    | 9  | 61  | 4B |
| TT21 | Aluminum | 9  | 80  | 0B |
|      | Steel    | 4  | 168 | 4B |
| TT22 | Aluminum | 10 | 61  | 4B |
|      | Steel    | 10 | 108 | 4B |

To further demonstrate the advantages of a variety of formulations of the metallic soap compositions, aluminum panels were coated with four examples of metallic soap compositions made with MSBO and/or a combination of MSBO, HMSBO, HSBO, and SBO in formulations similar as detailed in Table 1. The metal panels, consisting of Type A aluminum panels, available from Q-Panel, Cleveland, Ohio, were coated using an Eastwood Hot Coat system and the divalent metallic coating was annealed at 200° C. for 20 min. The coatings were continuous, contained 1% leveling agent, and were measured to be 20-30 μm. Leveling agents that may be used include, but are not limited, to siloxanes, acrylates, polyvinylether, amides, polyamides, and amide waxes made from natural oils, wherein such amide waxes are described in commonly assigned, pending provisional U.S. patent application Ser. No. 61/363,016, which is incorporated by reference in its entirety.

The resulting coated panels were conditioned in an environmental chamber by Cincinnati Sub-zero Testing Services, Sterling Heights Mich., for 7 days in accordance with industry standard test method MIL-STD-810G exposing the sample panels to seven 24-hour cycles of the following: (1) 50° C. and 100% relative humidity (RH) for 6 hours, (2) 5% salt spray at ambient conditions for 15 minutes, and (3) Drying off at 60° C. and 50% RH for 17 hours and 45 minutes.

After environmental conditioning, the panel coatings were evaluated for corrosion resistance in accordance with ASTM D1654 and adhesion tests were performed on each panel in accordance with ASTM D4541 and D3359. All of the test panel samples were rated as excellent (corrosion rating 10). Eleven of the sixteen test panels were rated very good or excellent in adhesion rating (rating 4B or 5B). The test panel ratings and strength values are listed in Table 8.

TABLE 8

Corrosion Test Panel Results
Cyclic Corrosion Test, MIL-STD-810G

| CYCLIC CORROSION TEST | Material | Corrosion Rating (10-1) | Adhesion Strength (psi) | Adhesion Rating (5B-0B) |
|---|---|---|---|---|
| TT6 | Aluminum | 10 | 46 | 4B |
| | Aluminum | 10 | 68 | 3B |
| | Aluminum | 10 | 57 | 4B |
| | Aluminum | 10 | 44 | 3B |
| TT9 | Aluminum | 10 | 55 | 4B |
| | Aluminum | 10 | 64 | 4B |
| | Aluminum | 10 | 50 | 4B |
| | Aluminum | 10 | 57 | 4B |
| TT10 | Aluminum | 10 | 60 | 3B |
| | Aluminum | 10 | 43 | 3B |
| | Aluminum | 10 | 40 | 4B |
| | Aluminum | 10 | 36 | 3B |
| TT11 | Aluminum | 10 | 57 | 5B |
| | Aluminum | 10 | 50 | 5B |
| | Aluminum | 10 | 43 | 5B |
| | Aluminum | 10 | 61 | 5B |

Asphalt Modifier Application

Testing of metallic soap compositions (samples TT29-TT31, aqueous process) at 0.5-1.0% loading level in standard asphalt mix (grade PG 64-22) using Brookfield Dynamic Viscometer produced favorable viscosity decreases of 10-20% as an asphalt modifier when compared to asphalt samples without metallic soap additives. The use of the aforementioned samples was intended for "warm mix" asphalt applications, where asphalt may be produced at temperatures of up to about 100° F. below conventional "hot mix" asphalt applications. Such lowered temperatures in warm mix applications provide for a lower cost, lower energy usage, safer handling, and lower environmental impact alternative to hot mix applications. Due to the reduced temperatures, the asphalt binder tends to be more viscous, which can make it more difficult to mix, spread, and compact. The viscosity of an asphalt binder is used to determine the flow characteristics of the binder to provide some assurance that it can be pumped and handled at an asphalt facility, and also to determine the mixing and compacting temperatures of asphalt mixtures. To offset the increased viscosity typically associated with warm mix asphalt, additives are often added to the asphalt mixture or to the asphalt binder before creating the asphalt mixture. The metallic soap compositions function as asphalt modifiers for viscosity reduction, and the details of the viscosity reduction are shown in Table 9 below.

Sample TT29 had the same compositional profile as Sample TT27 described earlier. The degree of saponification, as determined by IR analysis, was 100% after two hours. This sample was allowed to cool and then removed from the reactor as a powder.

Sample TT30 was a mixture of 500.0 grams of stripped MSBO, 26.4 grams of Ca(OH)$_2$ diluted to 373.6 grams with water were added to the reactor. The mixture was heated to 95° C. and stirred for 2 hours. Reaction ratios were calculated for 100% saponification. The degree of saponification, as determined by IR analysis, was 40% after two hours of reaction. This sample was allowed to cool and then removed from the reactor as a highly basic white slurry.

Sample TT31 was a mixture of 500.0 grams of stripped MSBO, 39.6 grams of Ca(OH)$_2$ diluted to 360.4 grams with water were added to the reactor. The mixture was heated to 95° C. and stirred for 2 hours. Reaction ratios were calculated for 100% saponification. The degree of saponification, as determined by IR analysis, was 60%, after two hours of reaction. This sample was allowed to cool and then removed from the reactor as a highly basic white slurry.

TABLE 9

| | Loading Level (wt %) | Viscosity (cP) | | | | |
|---|---|---|---|---|---|---|
| | | Run 1 | Run 2 | Run 3 | Average | Percent Change |
| PG 64-22 | NA | 685.0 | 685.0 | 687.5 | 685.8 | NA |
| TT29 | 1 | 612.5 | 615.0 | 615.0 | 614.2 | 10.4 |
| TT30 | 0.5 | 540.0 | 542.5 | 542.5 | 541.7 | 21.0 |
| TT31 | 0.5 | 550.0 | 552.5 | 552.5 | 551.7 | 19.6 |

While the invention as described may have modifications and alternative forms, various embodiments thereof have been described in detail. It should be understood, however, that the description herein of these various embodiments is not intended to limit the invention, but on the contrary, the intention is to cover all modifications, equivalents, and alternatives falling within the spirit and scope of the invention as defined by the appended claims and their equivalents. Further, while the invention has also been described with reference to the preceding non-limiting examples, it will be understood, of course, that the invention is not limited thereto since modifications may be made by those skilled in the art, particularly in light of the foregoing teachings.

What is claimed is:

1. A method of forming a metallic soap composition, the method comprising:
   (a) introducing an oil to a reactor, wherein the oil comprises a self-metathesized natural oil, a hydrogenated self-metathesized natural oil, or a mixture thereof;
   (b) heating and purging the oil in the reactor at a temperature between about 70° C. and about 140° C. in a nitrogenous atmosphere;
   (c) introducing a metal compound to the oil in the reactor to form a mixture, and heating and purging the mixture at a temperature between about 200° C. and about 400° C. in a nitrogenous atmosphere to form a partially saponified oil, wherein the metal compound comprises metal oxides, metal hydroxides, metal carbonates, metal alkoxides, or mixtures thereof; and
   (d) cooling the partially saponified oil to obtain a metallic soap composition.

2. The method of claim 1, wherein said metal compound is a metal hydroxide selected from the group consisting of calcium hydroxide, strontium hydroxide, lithium hydroxide, sodium hydroxide, potassium hydroxide, and magnesium hydroxide.

3. The method of claim 1, wherein said natural oil is selected from the group consisting of canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, pennycress oil, camellina oil, castor oil, lard, tallow, poultry fat, yellow grease, algal oil, fish oil, tall oils, and mixtures thereof.

4. The method of claim 1, wherein said partial saponification comprises between about 10 percent to about 100 percent saponification as measured by FTIR.

* * * * *